(12) United States Patent
Shin et al.

(10) Patent No.: US 8,255,333 B2
(45) Date of Patent: Aug. 28, 2012

(54) METHOD OF GENERATING LICENSE, AND METHOD AND APPARATUS FOR PROVIDING CONTENTS USING THE SAME

(75) Inventors: Jun-bum Shin, Anyang-si (KR); Yong-kuk You, Seoul (KR); Chi-hurn Kim, Hwaseong-si (KR); Young-sun Yoon, Suwon-si (KR); Ji-young Moon, Seoul (KR); Dave Ahn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 283 days.

(21) Appl. No.: 11/651,060

(22) Filed: Jan. 9, 2007

(65) Prior Publication Data
US 2007/0219922 A1 Sep. 20, 2007

(30) Foreign Application Priority Data
Mar. 15, 2006 (KR) .................. 10-2006-0023935

(51) Int. Cl.
*G06F 21/00* (2006.01)

(52) U.S. Cl. ............................. 705/59; 705/51
(58) Field of Classification Search .................. 705/59, 705/51
See application file for complete search history.

(56) References Cited

U.S. PATENT DOCUMENTS

| | | | | |
|---|---|---|---|---|
| 5,459,306 | A * | 10/1995 | Stein et al. | 235/383 |
| 2006/0178997 | A1* | 8/2006 | Schneck et al. | 705/50 |
| 2007/0073582 | A1* | 3/2007 | Jung et al. | 705/14 |

* cited by examiner

*Primary Examiner* — Pierre E Elisca
(74) *Attorney, Agent, or Firm* — Sughrue Mion, PLLC

(57) ABSTRACT

A method and apparatus for generating and updating a license for content and for providing content are provided. The method of generating a license includes generating license signature information for authenticating the license; generating use rule information for controlling the use of the content; generating authentication code information for authenticating a coupon for changing at least a portion of the use rule information; and generating key information required for decrypting the content.

28 Claims, 5 Drawing Sheets

METHOD OF GENERATING LICENSE, AND METHOD AND APPARATUS FOR PROVIDING CONTENTS USING THE SAME

CROSS REFERENCE TO RELATED PATENT APPLICATION

This application claims priority from Korean Patent Application No. 10-2006-0023935, filed on Mar. 15, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to updating a license and providing content using the license, in order to protect a copyright of digital content.

2. Description of the Related Art

As content becomes digitized, a digital rights management (DRM) technique for protecting a copyright of digital content is necessary. Copyrighters want to protect their copyrights, while users want to use contents conveniently. In order to satisfy such requirements, various DRM techniques have been developed. In order to protect copyrights when using content under various scenarios, studies into methods of establishing rules regarding content use with a license file that is separate from the content and controls content use, as well as DRM concerning simple encryption, are actively underway.

A representative DRM method is "MS-DRM" developed by Microsoft Corporation.

Details regarding content use can be controlled by means of a license. For example, a license can control content to only be played, allow copying of content, control the use term and amount of content use, control content conversion, etc. As such, a license can be made out to reflect various business models or various user scenarios in terms of the content use. By controlling content to be used only in a manner defined by the corresponding license, a copyright for the content is protected.

Generally, a license includes an electronic signature for determining whether the license has changed or has been hacked, as well as containing basic information for indicating the corresponding content and identifying the license. Also, the license includes information regarding a rule for controlling content use. In order to describe rule for content use, a standardized language, etc., such as XML-based "XrML", adopted as a standard in the MPEG Right Express Language (REL) is used. In order to include various user scenarios, new techniques are being established. Also, the license further includes information for generating a decryption key for decrypting the corresponding encrypted content. The decryption key information is combined with unique information of a device which tries to use the content and then is used to generate a key for decrypting the content.

Accordingly, in order to utilize content protected by DRM, as illustrated in FIG. 1, a user 1 receives desired content together with a license for the content from a provider 2, and uses the content only in a manner defined by the license. If the content has a use term from Jan. 1, 2006 to Jan. 10, 2006 and is allowed for playing only, the user 1 can play the content only during that period. If the user 1 wants to use the content after this period elapses, the user 1 must receive a new license for the content from the provider 2. In some cases, the user 1 must again download the corresponding content together with the new license.

Generally, since a license is a minimum of 128 bytes, it is very difficult to download the license when the corresponding apparatus or device is disconnected from a network. Particularly, in order to update a license through a mobile device, etc., a personal computer (PC) is needed. A convenient method is to download an updated license through a telephone or a mobile phone which can be connected to a network from wherever the user is. However, it is difficult to retransmit a license downloaded from the telephone or a mobile phone to a device which tries to use the corresponding content. Furthermore, it is difficult to transmit a license through short message service (SMS), etc. of a mobile phone, due to the large size of the license. Accordingly, a new method for solving the above-mentioned problems is needed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method of downloading only information regarding a changed part of an existing license when the user wants to update the license, and allowing a user to use the corresponding content pertaining to the changed use.

According to an aspect of the present invention, a license for content includes license signature information for authenticating the license; use rule information for controlling the use of the content; authentication code information for authenticating coupon for changing some or all of the use rule information; and key information required for decrypting the content. The coupon includes coupon authentication code information for authenticating the coupon, and coupon use rule information for controlling the use of the content.

The authentication code information of the license is information for authenticating the coupon using the coupon authentication code information and a unidirectional function. The unidirectional function may be a hash function, and accordingly, the authentication code information may be set to an initial value of the hash function.

According to another aspect of the present invention, there is provided a method of decrypting content, including: authenticating a license file and a coupon of the content; checking use rule information of the license file; checking use rule information of the coupon; extracting key information for decrypting the content from the license file; and decrypting the content.

According to another aspect of the present invention, there is provided a method of decrypting encrypted content, including: comparing the content use request with use rule information of the license of the content if a content use request is received from a user after the license of the content expires; receiving a coupon for changing some or all of the use rule information, from the user if the content use request does not correspond to the use rule information; authenticating the coupon; extracting key information for decrypting the content from the license; and decrypting the content.

Particularly, according to an aspect of the present invention, when a user requests to use the content in a mobile device, etc., having a limited access to a network after a use term of content elapses, the user must download a separate coupon corresponding to the license. Thereafter the user directly inputs the downloaded coupon into the device, the coupon is authenticated, use term updating information of the coupon is compared with the user's content request and the use of the content can be controlled according to the user's content request.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The invention may, however, be exemplarily embodied in many different forms and should not be construed as being limited to the exemplary embodiments set forth herein; rather, these exemplary embodiments are provided so that this disclosure will be thorough and complete, and will fully convey the concept of the invention to those of ordinary skill in the art.

Figure 1:
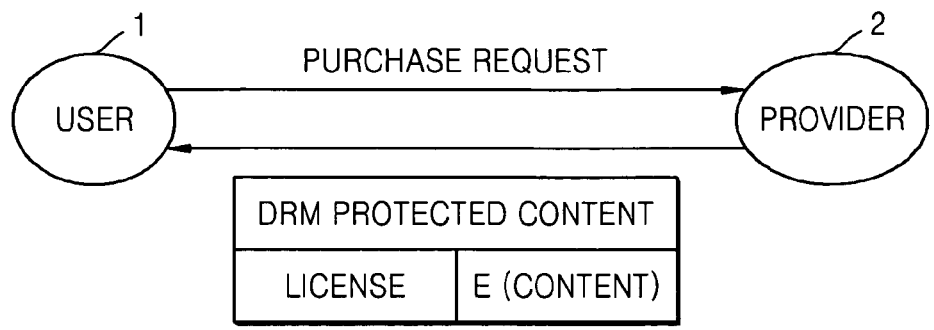
FIG. 1 is a view for explaining a content purchasing method according to a related art technique.
Figure 2A:
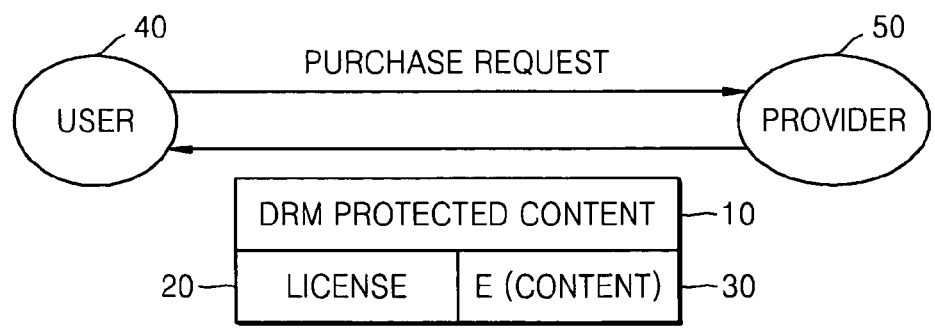
FIGS. 2A and 2B are views for explaining a content purchasing method according to an exemplary embodiment of the present invention.
Figure 2B:
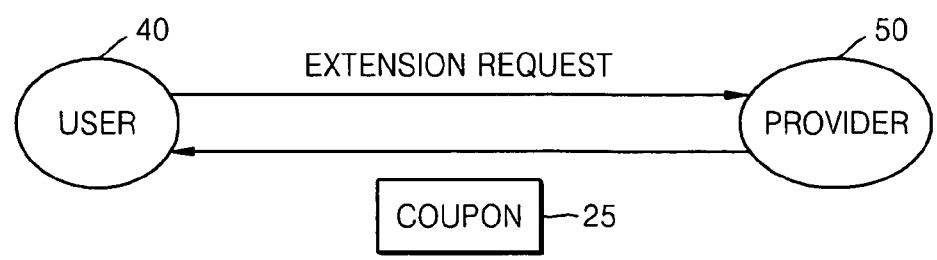

FIGS. 2A and 2B are views for explaining a content purchasing method according to an exemplary embodiment of the present invention. Referring to FIG. 2A, when a user 40 purchases DRM protected content 10, he or she pays appropriate costs for the content 10 to a provider 50, and then receives the content 10 together with a license 20 of the content 10, from the provider 50. Then, the user 40 uses the content 10 in a manner defined by the license 20. For example, if a use term is set in the license 20, the user 40 can use the content 10 in the defined manner only during the use term. In this case, if the use term elapses, the user 40 cannot use the content 10.

When the user 40 wants to use the content 10 after the use term elapses, according to a related art method, the user must download the content 10 again, together with a new license to use the content 10. However, according to an exemplary embodiment of the present invention, the user 40 downloads a coupon 25 including details for a part of a license to update the license.

Referring to FIG. 2B, the coupon 25 is similar to an existing license, but can be used together with the existing license and cannot function as an independent license. The coupon 25 is used together with the existing license, or substitutes for or complements a part of the existing license. Accordingly, if the user 40 receives a coupon for an extension of the use term of the content, he or she can use the content in the defined manner during the extended term. The detailed structures of the license 20 and the coupon 25 will be described later.

Figure 3A:
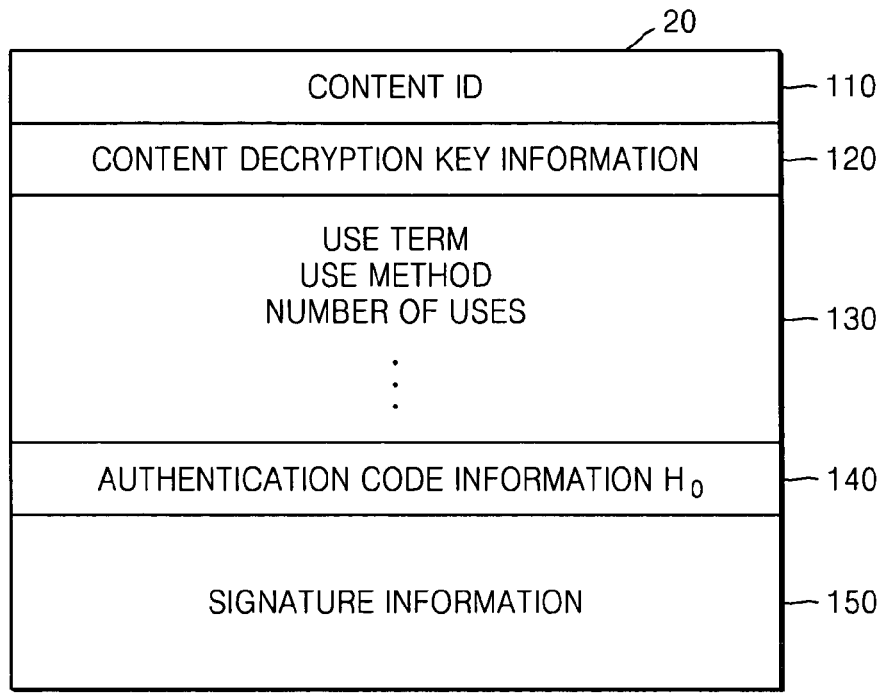
FIGS. 3A, 3B, and 3C are views for explaining a license structure according to an exemplary embodiment of the present invention.

FIG. 3A illustrates the structure of a license according to an exemplary embodiment of the present invention. Generally, the license includes a content identifier (ID) 110, use rule information 130, information 120 regarding a content decryption key, authentication code information $H_o$ 140, signature information 150, etc.

The content ID 110 is information indicating content corresponding to the license, wherein each item of content has a unique ID and a separate license exists for each item of content. Alternatively, a license can be used for several items of content, or a license can be used for a limited portion of the content.

The use rule information 130 is information for controlling the content use so that the content is used only in a manner defined by the use rule information 130. The use rule information 130 controls the use of the content, and can include a use term, a use method, the number of uses, etc. The use term means an available period of time during which the content can be used, and the use method means a use manner, such as playing or copying of the content, etc., in which the content is substantially used. Also, the number of uses means the number of repeated uses according to the use method. The use rule information 130 can include various use rules other than the above-mentioned examples. Methods for describing the use rule information are different for each DRM system. A representative standardized description method is "XrML" developed by the MPEG. A use rule generated according to a defined method can be interpreted by a DRM client.

Also, the content decryption key information 120 is information for generating a key for decrypting encrypted content. Generally, key for decrypting content is generated using both information stored in a device and information stored in a license. Alternatively the key can be extracted from only a license. However, if a license is changed by a third party, a copyright of the corresponding content cannot be properly protected and a user's rights can be impinged.

Accordingly, in general, a license includes signature information 150 for determining whether or not a change occurs in the license 20. A device which tries to use content determines whether a change has occurred in the license 20 for the content, and then controls the use of the content according to the use rule information of the license 20.

Generally, the signature information 150 is composed of parts of the respective information of the license (110, 120, 130 etc.). Since a signature value changes if a part of a license changes, it is possible to determine whether a change has occurred in the license 20. A license file can be separate from the content, however. In many cases, the license file exists in the header of the content together with information regarding the content. If a license file exists in the header of the content, information regarding the content is included in the header of the content, but not in the license 20.

Figure 3B:
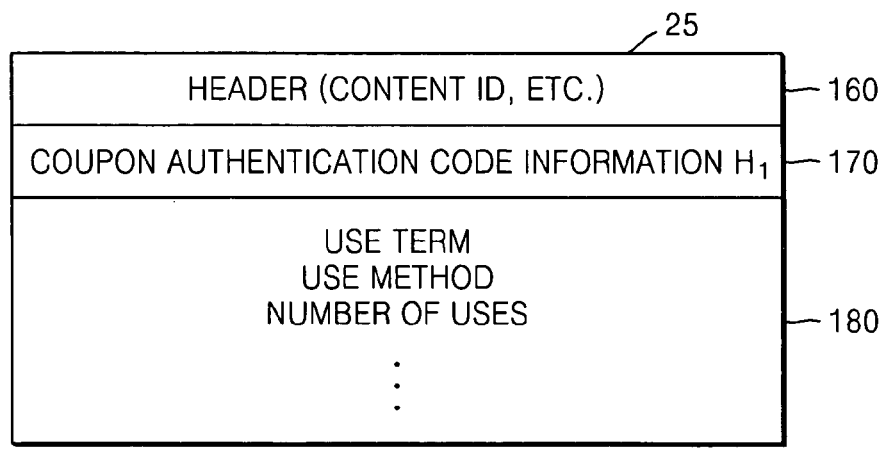
Figure 3C:
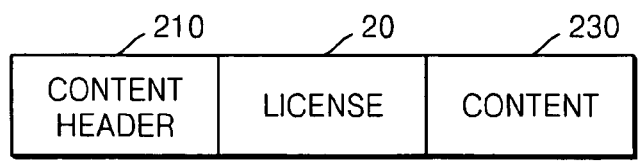

FIG. 3C illustrates the structure of the above-mentioned license file. For example, information such as a content ID exists in the header 210 of the content. Use rule information or signature information and content key information exists in a license 20.

The license 20 further includes authentication code information $H_0$ 140 for authenticating a coupon 25 for changing or substituting details of a part of the license 20, wherein the term "coupon" is used to distinguish it from the term "license". Whether the coupon 25 has changed and whether the coupon 25 is issued by an authentic provider are verified through the authentication code information $H_0$ 140. Since such a coupon is actually subject to a license, authentication is performed using a license. Alternatively, it is possible to safely store the authentication code information $H_0$ 140 in a DRM client of a device. The DRM client is a program or a unit installed in the device in order to use content protected by a specific DRM technique, such as Microsoft DRM or Marlin DRM, etc. Substantially, authentication of the coupon is performed in the DRM client.

For example, the DRM client authenticates the coupon using the coupon authentication code information $H_1$ and the authentication code information $H_0$. Substantially, authentication is performed using the authentication function given below, based on a specific function existing in the DRM client.

$$H_0 = \text{Function}(H_1)$$

The coupon 25 is authenticated by using the above authentication function. Parameters for authentication must be protected so that hackers cannot easily access them. Particularly, it may be desirable that the coupon authentication code information $H_1$ cannot be extracted from the authentication code information $H_0$. As an example of the specific function, a function which is cryptographically safe and unidirectional can be selected. In order to implement the authentication function, a hash chain can be used. An exemplary hash chain having a length of 3 satisfies the equations below.

Unidirectional function: Hash
Values: $H_3, H_2, H_1, H_0$ $$\text{Hash}(H_1) = H_0,$$

$$\text{Hash}(H_2) = H_1 \text{->} \text{Hash}(\text{Hash}(H_2)) = \text{Hash}^2(H_2) = H_0$$

$$\text{Hash}(H_3) = H_2 \text{->} \text{Hash}^3(H_3) = H_0$$

In an exemplary embodiment of the present invention, a hash chain having a length of 3 is used. In order to use the hash chain, the authentication code information $H_0$ must be registered by a provider. In an exemplary embodiment of the present invention, a DRM client of a device which tries to use content must know a value of the authentication code information $H_0$ 140. In an exemplary embodiment of the present invention, the authentication code information $H_0$ 140 can be included in an existing license 20, or can be safely stored in a device to which DRM is applied.

In an exemplary embodiment of the present invention, when a use term elapses and the content can no longer be used, a process for extending the use term by using a coupon 25 will now be described.

Returning to FIG. 3A, which illustrates the structure of a license 20 according to an exemplary embodiment of the present invention, the license 20 includes authentication code information $H_0$ 140 for authenticating a coupon 25, which existing licenses don't have. The authentication code information can consist of different authentication code information ($H_0, X_0, Y_0$, etc.) for different use rules (a use term, a use method, the number of uses, etc.), or can consist of single authentication code information $H_0$ 140 for all use rules of a license. Users usually like to change the use rules by means of the coupon 25. In case of other information of the license other than the use rules, authentication code information can consist of different authentication code information for the other information, or can consist of single authentication code information for all other information.

FIG. 3B illustrates a structure of a coupon 25, according to an exemplary embodiment of the present invention. Generally, a coupon 25 includes header information 160 for identifying the coupon 25 based on information about a content ID or a license ID, etc. Also, the coupon 25 includes details corresponding to use rules 180. For example, the coupon 25 can include details regarding an extension of a use term or the changing or adding of a use method, and can further include details regarding increasing of the number of uses, etc. Also, the coupon 25 further includes coupon authentication code information $H_1$ 170 for authenticating the coupon 25. As described above, the coupon authentication code information $H_1$ 170 is used to authenticate the coupon 25 by means of the corresponding license 20. Though the coupon authentication code information $H_1$ 170 performs a function actually similar to signature information of a license, the term "coupon authentication code information" is used in order to avoid confusion with the signature information 150.

Figure 4A:
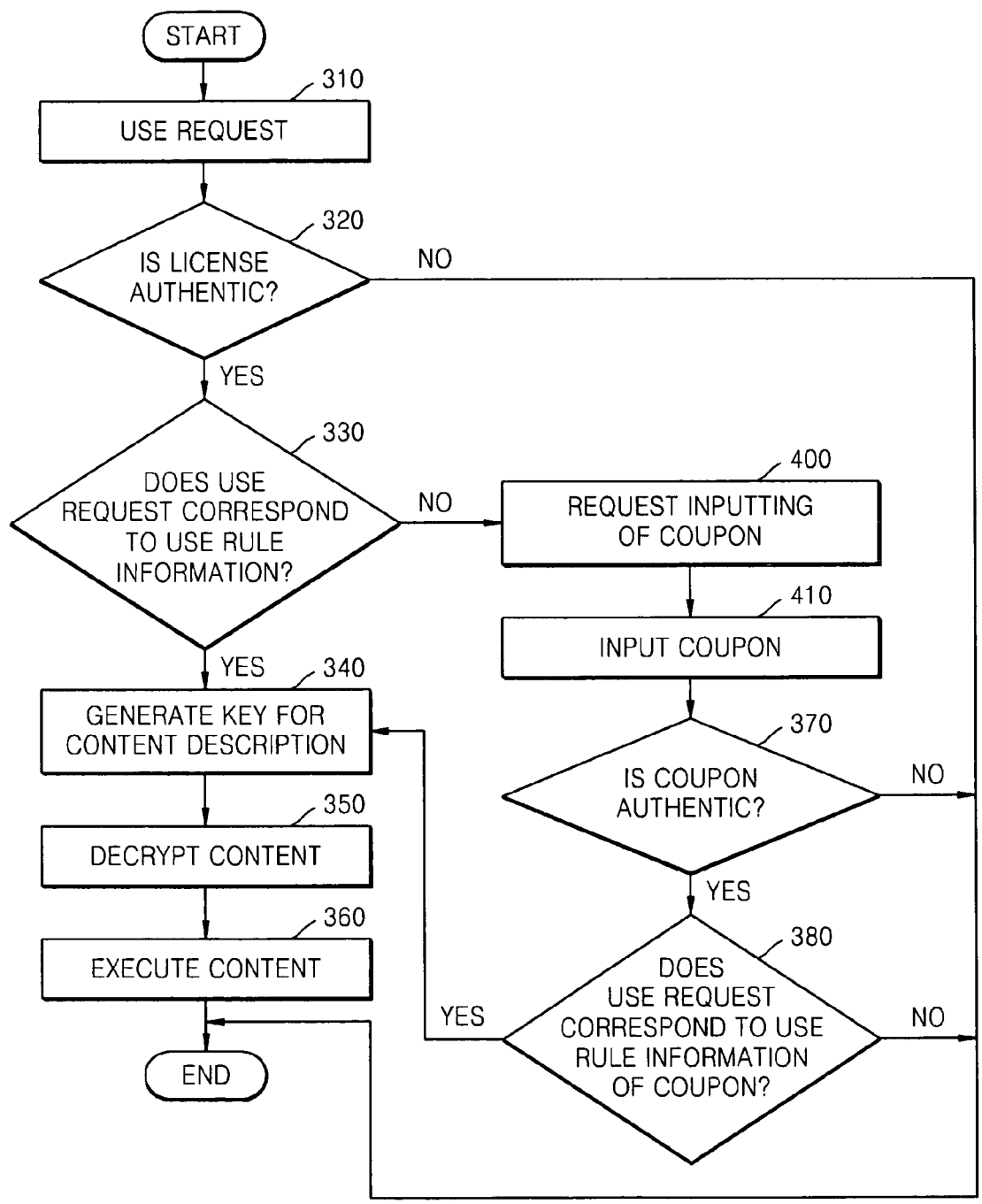
FIG. 4A is a flowchart illustrating a content decryption method according to an exemplary embodiment of the present invention.
Figure 4B:
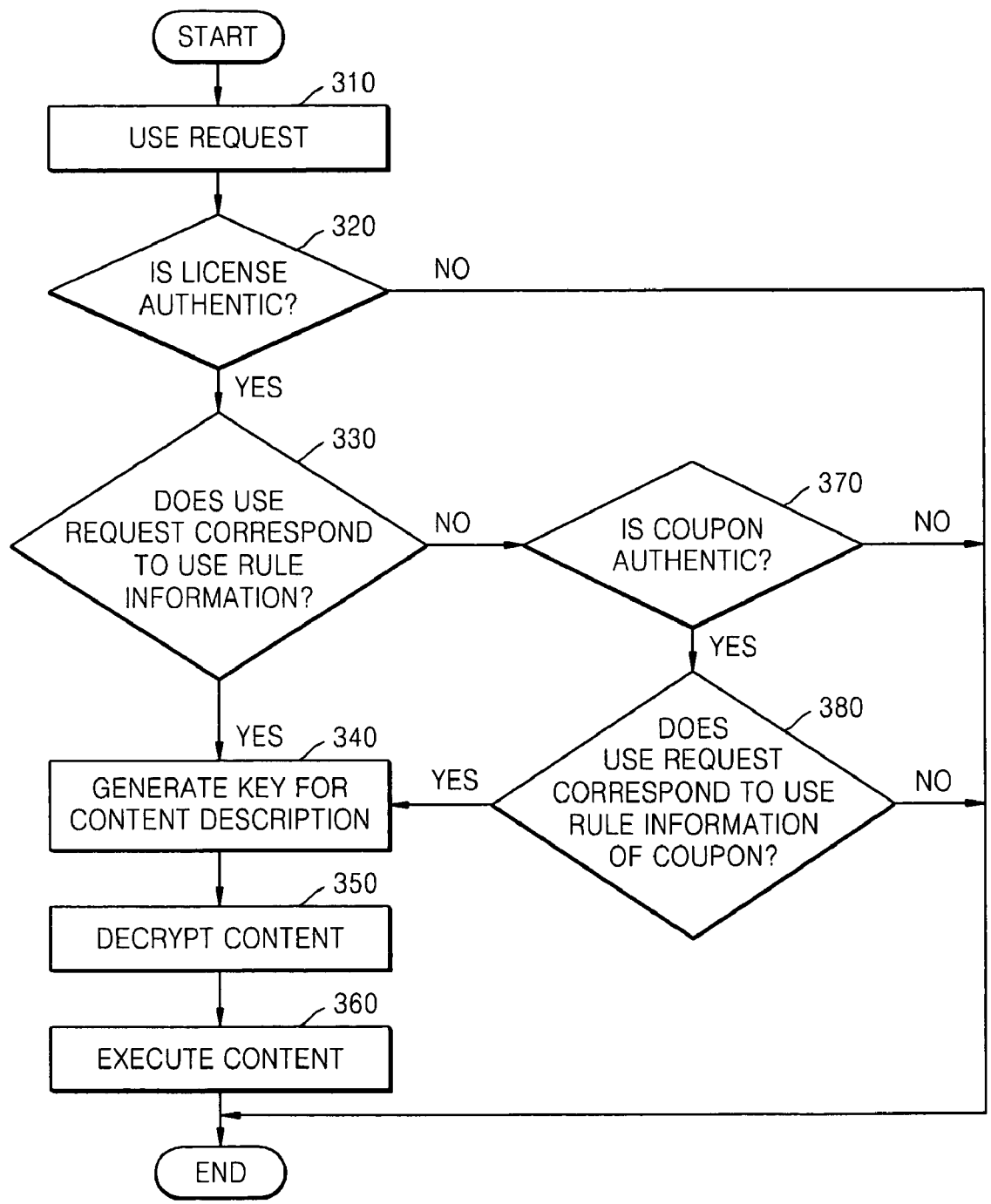
FIG. 4B is a flowchart illustrating a content decryption method according to another exemplary embodiment of the present invention.

FIG. 4A is a flowchart illustrating a content decryption method according to an exemplary embodiment of the present invention. FIG. 4B is a flowchart illustrating a content decryption method according to another exemplary embodiment of the present invention.

Referring to FIG. 4A, a user selects specific content and inputs a use request (play, copy, etc.) (operation 310). Then, a DRM client verifies a license 20 for the content, thereby determining whether the license 20 has been changed or hacked (operation 320). Authentication of the license 20 is performed using signature information 150, etc. of the license 20. If the license 20 is determined to be authentic, use rule information 130 of the license 20 is checked and it is determined whether or not the user's use request corresponds to the use rule information 130 (operation 330). Here, if the user's use request corresponds to the use rule information 130, a DRM client generates a content decryption key 120 (operation 340), and decrypts and executes the content according to the user's use request (operations 350 and 360).

If the user's use request does not correspond to the use rule information 130, a message is sent to request the user to input a coupon 25 (operation 400). In response to the message, the user can request a service provider for a coupon 25 corresponding the content through a network, and download the coupon 25 from the service provider 50. If a device, which tries to use the content, is a device, such as a mobile device, having a limited access to a network, the user can download the coupon 25 through a separate device (a mobile phone, etc) which can easily access the network.

When the device which tries to use the content is in a good network environment, downloading a new whole license to update the present license 20 will be convenient and easy. However, it is more effective to download a small amount of information. Particularly, if the device is in a poor network environment, it is more effective to download the coupon 25 through a different device which is in a good network environment. Accordingly, it is effective to use a telephone, etc. that can be connected to a network anywhere.

Once the coupon 25 downloaded in this manner is input (operation 410), the DRM client authenticates the coupon 25 (operation 370), compares use rule information 180 of the coupon 25 with the user's use request, and determines whether or not to execute the content (operation 380). If the user's use request corresponds to the use rule information 180 of the coupon 25, the DRM client extracts a content decryption key 120 from the license 20 and executes the content.

Particularly, in operation 410, the coupon 25 can be downloaded to a separate third device, and then inputted by the user from the separate third device to the device which tries to use the content, or the coupon 25 can be input directly from a network to the device which tries to use the content. In the case when the coupon 25 is input by the user, the corresponding coupon file will have a limitation in terms of size. In this case, it is desirable that the size of the coupon file is below the size of a SMS text message.

In a case of a domestic mobile phone text authentication system, a method of transmitting six-digit authentication code information by means of mobile phone SMS and allowing a user to manually input a value of the six-digit authentication code information, is used. The method is widely used due to its high security and convenience of use. Accordingly, in an exemplary embodiment of the present invention, it is useful for the coupon 25 to have a data having six digits more or less. Since an existing license file is 128 bytes, it is difficult to download the license file, and it is impossible that the user directly input the license file. However, if a 25 coupon having the same size as the six-digit authentication code information is used, since only a maximum of 20 bytes are used, a network load can be reduced and direct inputting by a user is possible.

In operation 370 of authenticating the coupon 25, as described above, authenticity of the coupon is verified by using the authentication code information 140 of the license 20 and the coupon authentication code information 170 included in the coupon 25. In order to authenticate the coupon 25, various authentication methods can be applied. In the present exemplary embodiment, an authentication method using a hash function is used. The checking of use rules by means of the coupon (operation 380) is not different from checking of use rules by means of a license other than that two use rules are needed. There are more than two ways to combine the two use rules. One of them is to manage the two use rules as separate files and allow the DRM client to access the files when necessary. Another way is to newly update the part of the license using the coupon.

Thereafter, if the user wants to use the content, the user can use the content by means of a pre-stored license 20 and a pre-stored coupon 25 as seen in FIG. 4B. Accordingly, as described above, the checking of the license signature 150 (operation 320) and the checking of coupon 25 authentication (operation 370) are performed in response to a user's use request (operation 310), use rule information 130 of the license and coupon 180 is compared with the user's use request so that it may be determined whether the content is to be executed (operations 330 and 380), and the content decryption key 120 is generated (operation 340) so that the content can be used (operation 350).

The method according to an exemplary embodiment of the present invention is more useful when limited access to a network is available. When a network environment is good, it is not difficult to download a new license. However, when the network environment is poor, it is difficult to download a license. Recently, since many users use personal telephone terminals, telephone terminals can be used effectively when a network environment of the device which tries to use the content is poor. Accordingly, it is more effective to download part of a license through a telephone terminal.

By providing a method of downloading only information for part of a license, the present exemplary embodiment can be easily applied in a poor network environment. Particularly, since a user must directly input a license to a device, a coupon having a small size is more effective. Also, it is desirable that the size of the coupon is smaller than the size of a SMS text message. In the case of a domestic mobile phone text authentication system, a method of transmitting six-digit authentication code information by means of a mobile phone SMS and allowing a user to directly input the value of the six-digit authentication code information, is used. The method is widely used due to its high security and convenience of use.

Accordingly, in an exemplary embodiment of the present invention, it is useful for the coupon to have a data having six digits more or less.

Figure 5:
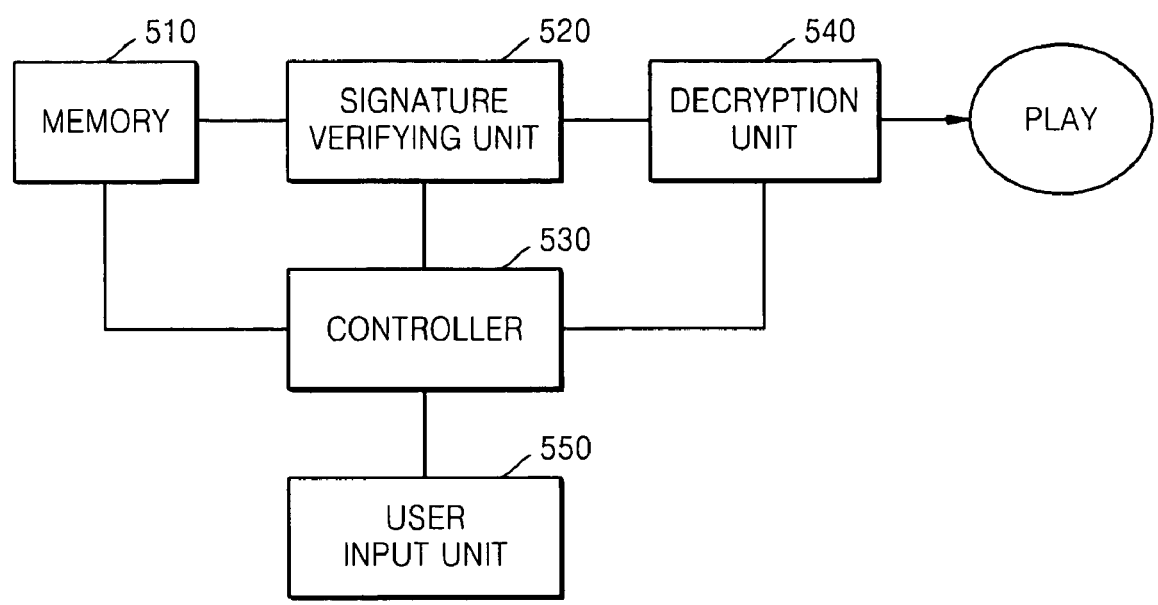
FIG. 5 is a block diagram of a content decryption apparatus according to an exemplary embodiment of the present invention.

FIG. 5 is a block diagram of a content decryption system according to an exemplary embodiment of the present invention. Referring to FIG. 5, the content decryption system includes a memory 510 that receives and stores contents and licenses; a signature verifying unit 520 that reads a license 20 and a coupon 25 from the memory 510 and verifies a signature of the license 150 to authenticate the coupon 25; a controller 530 that compares a user's content use request with use rule information 130 and 180 of the license 20 and coupon 25, respectively, and determines whether to comply with the user's content use request; and a content decryption unit 540 that extracts information for decrypting the content 120 and then decrypting the content.

The memory 510 includes a hard disc drive (HDD) or a flash memory, an optical recording medium, and an arbitrary device for storing and reading digital information. In the case of streaming type of content it is impossible to store the content separately in a device. However, in these cases, the content will be stored in a temporary buffer. The signature verifying unit 520 verifies the authenticity of a signature part 150 of the license 20. The signature verifying unit 520 performs the same function as a DRM client does. That is, the DRM client included in the device performs a function of interpreting the license 20 and decrypting the content.

The signature part 150 of the license 20 is a sum of some parts of the license 20 and is used to determine whether the license 20 has changed or is hacked. Also, in an exemplary embodiment of the present invention, the signature verifying unit 520 determines authenticity of coupon authentication code information 180 of the coupon 25 with respect to authentication code information 140 stored in the license 20.

In the current exemplary embodiment, the determination of the authenticity of the coupon authentication code information 170 is performed using a hash function. Also, the controller 530 determines whether a user's content use request conforms to the use rule information 130 or coupon use rule information 180 of the license 20. If the user's content use request conforms, the controller 530 performs the following process according to the user's content use request. If the user's content use request does not conform, the controller 530 terminates the process or notifies the user and request the user to input a coupon 25.

If the coupon 25 is input, the coupon 25 is authenticated and compared with the user's content use request, thereby determining whether to execute the coupon 25. If the user's use request corresponds to the use rule information 130/180 of the license 20/coupon 25, the decryption unit 540 extracts information required for decryption from the license 20, and generates key for decrypting the content 120, using the extracted information. Generally, the content decryption key is generated using a different method according to the type of DRM system. In general the content decryption key is obtained using the information of the license 20 with device information safely stored in the device or specific information of the DRM. As such, if the content decryption key is generated, the content is actually decrypted using the content decryption key. In order to decrypt the content, various encryption algorithms such as the Advanced Encryption Standard (AES) can be used. The resultant decrypted content is executed in correspondence to the user's content use request.

The invention can also be exemplarily embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing exemplary embodiments of the present invention can be easily construed by programmers skilled in the art to which the present invention pertains.

In a content decryption method and apparatus, according to exemplary embodiments of the present invention, it is possible to update a license using an easier and more convenient method. Particularly, the present invention is more effective when a network environment is poor. Also, it is possible to update a license using only a message having a small size.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of generating a license for content, the method comprising:
   generating license signature information for authenticating the license;
   generating, by a controller, use rule information which controls the use of the content;
   generating, by the controller, authentication code information for authenticating a coupon for changing at least a portion of the use rule information; and
   generating, by the controller, key information which is extracted from the license and used to decrypt the content.

2. The method of claim 1, wherein the coupon comprises coupon authentication code information for authenticating the coupon, and coupon use rule information for controlling the use of the content.

3. The method of claim 2, wherein the authentication code information is for authenticating the coupon using a unidirectional function and the coupon authentication code information.

4. The method of claim 3, wherein the unidirectional function is a hash function, and the authentication code information is an initial value of the hash function.

5. The method of claim 2, wherein the coupon use rule information is information regarding a use term of the content.

6. A method of decrypting encrypted content, the method comprising:
   authenticating, by a controller, a license for the content;
   authenticating, by the controller, a coupon for the content based on the license;
   checking, by the controller, use rule information of the license to verify that a content use request by a user is allowed under the license;
   checking, by the controller, content use rule information of the coupon, to verify that the content use request by the user is allowed under the coupon for changing at least a portion of the use rule information;
   extracting, by the controller, key information for decrypting the content from the license if the content use request by the user is allowed under at least one of the license and the coupon; and
   decrypting the content, by the controller, based on the key information.

7. The method of claim 6, wherein the coupon comprises coupon authentication code information for authenticating the coupon, and coupon use rule information for controlling the use of the content.

8. The method of claim 7, wherein the license comprises authentication code information for authenticating the coupon.

9. The method of claim 8, wherein the authentication code information is for authenticating the coupon using a unidirectional function and the coupon authentication code information.

10. The method of claim 9, wherein the unidirectional function is a hash function, and the authentication code information is an initial value of the hash function.

11. A method of decrypting encrypted content, the method comprising:
    receiving a content use request from a user;
    comparing, by a controller, the content use request with use rule information of a license for the content;
    requesting, by the controller, the user to input a coupon for changing at least a portion of the use rule information if the content use request does not correspond to the use rule information;
    extracting, by the controller, key information for decrypting the content from the license; and
    decrypting, by a content decryption device, the content using the key information.

12. The method of claim 11, further comprising:
    receiving the coupon for changing at least a portion of the use rule information from the user;
    authenticating the coupon of the content based on the license;
    extracting key information for decrypting the content from the license; and
    decrypting the content using the key information.

13. The method of claim 12, wherein the coupon comprises coupon authentication code information which authenticates the coupon, and coupon use rule information for controlling the use of the content.

14. The method of claim 13, wherein the license comprises authentication code information for authenticating the coupon.

15. The method of claim 14, wherein the authentication code information is for authenticating the coupon using a unidirectional function and the coupon authentication code information.

16. The method of claim 15, wherein the unidirectional function is a hash function, and the authentication code information is an initial value of the hash function.

17. A method of using content whose use term elapses, the method comprising:
    receiving a coupon for changing at least a portion of the use rule information comprising use term updating information of the content;
    authenticating, by a controller, the coupon using a license for the content;
    comparing, by the controller, a use request of the content with the use term updating information of the coupon;
    extracting, by the controller, key information for decrypting the content from the license; and decrypting, by the controller, the content using the key information.

18. The method of claim 17, wherein the coupon size is below 20 bytes.

19. The method of claim 18, wherein the coupon is received through a device other than a device which tries to use the content, and is then inputted by a user to the device which tries to use the content.

20. The method of claim 19, wherein the coupon is verified using information included in the license.

21. An apparatus for decrypting content, the apparatus comprising:
a user request receiver which receives a content use request from a user;
controller, in connection with the user request receiver, which authenticates a license and a coupon of the content and a coupon of the content for changing at least a portion of the use rule information, a controller checks use rule information of the content from the license, controls use of the content according to the use rule information, extracts key information for decrypting the content from the license, and decrypts the content using the key information
a content decryption unit.

22. The apparatus of claim 21, wherein the controller checks use rule information of the content from the coupon if the content use request does not correspond to the use rule information of the license.

23. The apparatus of claim 21, wherein the controller authenticates the coupon using information included in the license.

24. A non-transitory computer readable recording medium which stores a license, wherein the license for content comprises:
license signature information for authenticating the license;
use rule information for controlling the use of the content;
authentication code information for authenticating a coupon for changing at least a portion of the use rule information; and
data including key information required for decrypting the content;
wherein the key information for decrypting the content is extracted from the license when a content use request corresponds to the use rule information, and
wherein the key information is used to decrypt the content.

25. A non-transitory computer readable recording medium having embodied thereon a computer program which, when executed by a computer, performs a method of decrypting encrypted content, the method comprising:
authenticating a license for the content;
authenticating a coupon for the content based on the license;
checking use rule information of the license to verify that a content use request by a user is allowed under the license;
checking content use rule information of the coupon for changing at least a portion of the use rule information to verify that the content use request by the user is allowed under the coupon;
extracting key information for decrypting the content from the license if the content use request by the user is allowed under at least one of the license and the coupon; and
decrypting the content using the key information.

26. A non-transitory computer readable recording medium having embodied thereon a computer program which, when executed by a computer, performs a method of decrypting encrypted content, the method comprising:
receiving a content use request from a user;
comparing the content use request with use rule information of a license for the content; and
requesting the user to input a coupon for changing at least a portion of the use rule information if the content use request does not correspond to the use rule information.

27. A non-transitory computer readable recording medium having embodied thereon a computer program which, when executed by a computer, performs a method of using content whose term elapses, the method comprising:
receiving a coupon for changing at least a portion of the use rule information comprising use term updating information of the content;
authenticating the coupon using a license for the content;
comparing a use request of the content with the use term updating information of the coupon;
extracting key information for decrypting the content from the license; and
decrypting the content using the key information.

28. A non-transitory computer readable recording medium having embodied thereon a computer program which, when executed by a computer, performs a method of generating a license for content, the method comprising:
a user request receiver which receives a content use request from a user;
a signature verifying unit which authenticates a license and a coupon of the content and a coupon of the content for changing at least a portion of the use rule information;
a controller which checks use rule information of the content from the license, controls use of the content according to the use rule information, and extracts key information for decrypting the content from the license; and
a content decryption unit which decrypts the content using the key information.

* * * * *